Dec. 5, 1950   J. SELBY   2,533,056
CHANGE-SPEED GEAR
Filed Dec. 30, 1947
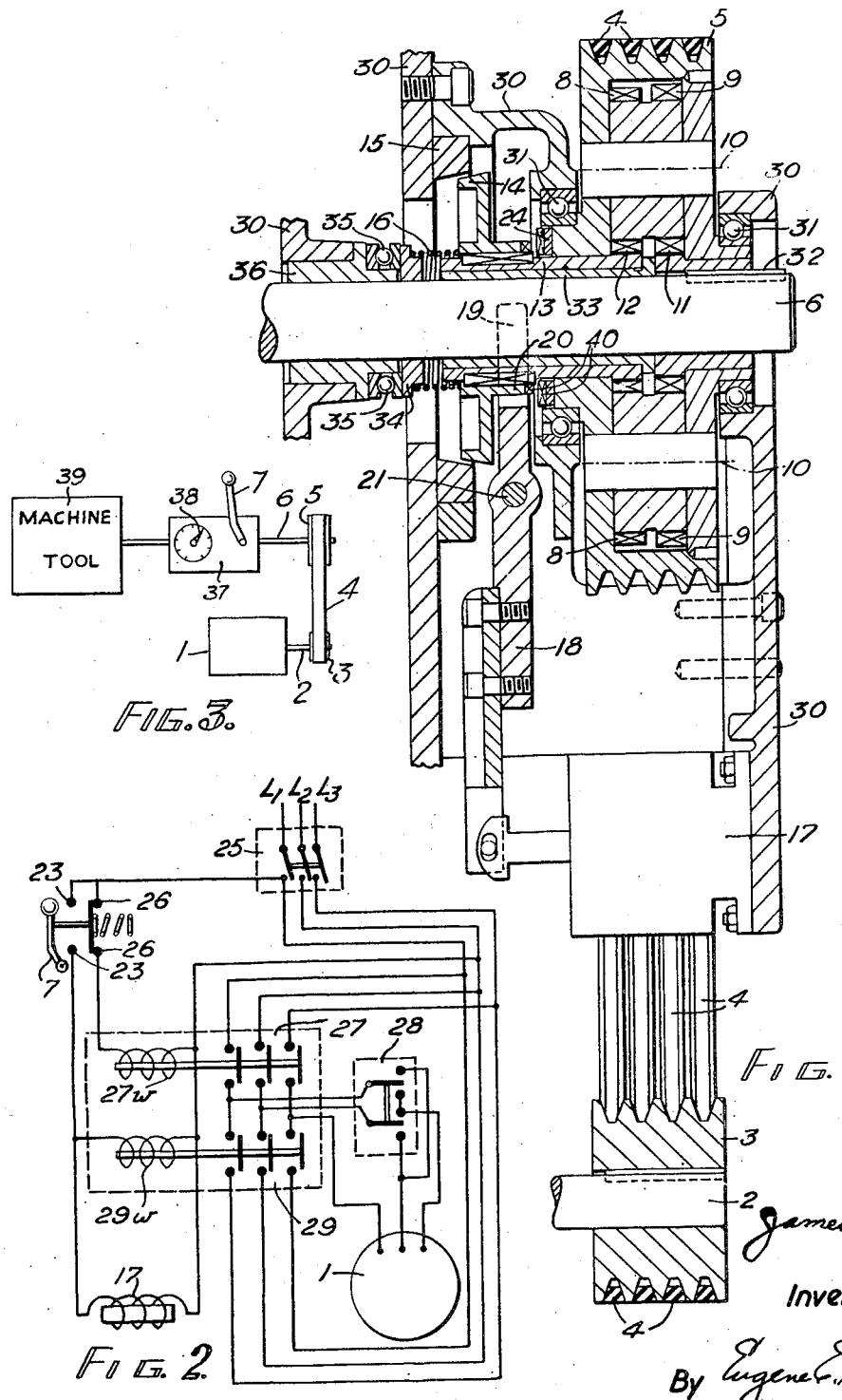

Patented Dec. 5, 1950

2,533,056

UNITED STATES PATENT OFFICE 2,533,056

CHANGE-SPEED GEAR

James Selby, Middlesex, England, assignor to Victoria Machine Tool Company Limited, London, England, a British company Application December 30, 1947, Serial No. 794,553
In Great Britain June 13, 1945

Section 1, Public Law 690, August 8, 1946
Patent expires June 13, 1965

4 Claims. (Cl. 74—740)

This invention relates to change speed gears and refers particularly but not exclusively to the change speed gears employed with machine tools.

The object of the invention is the provision of improved means for enabling the gear changes to be effected easily and safely.

The invention consists broadly in the provision in an arrangement comprising a prime mover, a device driven thereby and a change speed gearing between said prime mover and said driven device, of a transmission mechanism between said prime mover and said change speed gearing and means whereby the transmission ratio of said transmission mechanism is adapted to be greatly reduced and then returned to normal, in order that the gears may be rotating slowly while the gear change is being eeffcted, said transmission mechanism comprising driving and driven elements rotatable about a common axis, a pair of coaxial planet pinions having different diameters and constrained to rotate as one piece, said pinions being rotatably mounted on said driving element with their axis parallel to, and at a suitable radius from, the axis of said elements, one of said planet pinions being in mesh with a sun pinion which is fast on said driven element, and the other being in mesh with a sun pinion which is rotatable about the axis of said elements and is adapted alternatively to be coupled either fast to one of said elements (whereby the transmission ratio from said driving to said driven element is unity) or fast to a fixed part (whereby the transmission ratio from said driving to said driven element is much reduced).

In accordance with one arrangement, the invention is applied to a machine tool, which is provided with change speed gearing, and which has associated with it a single preselecting element adapted to be preset to a position corresponding to the required speed ratio, and a single gear changing element adapted, upon actuation from a normal to an operative position, to effect the gear change to the speed ratio preselected by the preselecting element. The device comprising the preselecting element and the gear changing element may be in accordance with our prior British specification No. 22,351/44.

In applying the invention to such a machine tool, the transmission device, which is provided in the drive between the prime mover and the gears, normally transmits at its one-to-one ratio, and the arrangement is such that, in response to the gear changing element being actuated from its normal to its operative position so as to effect a gear change, said transmission device is automatically set for transmitting at its speed reduction ratio. Thus, while the gears are being actually shifted into their new positions, they are being driven very slowly, and this both ensures that they will be able to engage with each other, and that they will not suffer damage in so doing. When the gear changing element is returned to its normal position leaving the gears at their new speed, the transmission device is automatically re-set to its one-to-one ratio. Thus when the operator desires to make a gear change, all that he has to do is to set the preselecting element to the required speed and move the gear changing element from its normal to its operative position and back again, and the gear change will be effected easily and under conditions of perfect safety.

Figure 1 of the accompanying drawings is a sectional side elevation of the said transmission device;

Figure 2 is a circuit diagram illustrating the manner in which the transmission device, the change speed gearing and the electric motor forming the prime mover are inter-related.

Fig. 3 is a diagrammatic illustration of the scheme as a whole.

Referring to the drawings, an electric motor 1 (Figures 2 and 3) drives a shaft 2 (Figures 1 and 3) which has fast on it a pulley 3. This pulley 3, through belting indicated at 4, drives a pulley 5 which, in turn, drives a shaft 6 which, through a change speed gearing 37 having a preselecting element 38 and a gear changing element 7, drives the machine tool 39. As will hereinafter appear, the pulley 5 may be either coupled direct to the shaft 6 or may be coupled to said shaft at a very high speed reduction ratio. Normally, said pulley 5 is direct coupled to said shaft 6, and the arrangement is such that in response to the gear changing element 7 (Figures 2 and 3) being actuated from its normal to its operative position so as to effect a gear change, said pulley 5 becomes coupled to said shaft 6 at the said high speed reduction ratio.

When said gear changing element 7 is returned to its normal position, leaving the gears at their new speed, the pulley 5 becomes again direct coupled to the shaft 6.

Thus all the operator has to do in making a gear change is to set the preselecting element 38 to the required speed, and then move the gear changing element 7 from its normal position and back again and the gears will be automatically slowed to a very slow speed while the gear change is being made and the gear change will accordingly be effected easily and under conditions of perfect safety.

The change speed gearing forms no part of the invention per se and further description thereof is not deemed necessary. As an example of such a mechanism, we refer to prior British Patent No. 587,604 which has a gear changing element 27 or 58 (corresponding to the present element 7) and a preselecting element 15 or 57 (corresponding to the present preselecting element 38).

Describing now the manner in which the pulley 5 may be coupled to the shaft 6 either direct or through a speed reduction ratio, said pulley is mounted loosely on said shaft and a pair of coaxial planet pinions 8 and 9 having slightly different diameters and forming one rigid piece are rotatably mounted on said pulley wheel with their axis 10 parallel to and at a suitable radius from the axis of the shaft 6. The larger of these planet pinions 9 is in mesh with a sun pinion 11 which is fast on the shaft 6 and the smaller of the planet pinions 8 is in mesh with another sun pinion 12 which is loose on said shaft 6 and which can be coupled fast alternatively to the pulley wheel 5 or to a fixed part. The sun pinion 11 will, of course, be of smaller diameter than the sun pinion 12.

It will be seen that when the sun pinion 12 is coupled fast to the pulley wheel 5, the whole system including said pulley wheel 5, the planet pinions 8 and 9, the sun pinions 11 and 12, and the shaft 6 must rotate as one piece and form a direct drive. When on the other hand, said sun pinion 12 is coupled fast to a fixed part, the planet pinion 8 must, as the pulley wheel 5 rotates, roll around said sun pinion 12, and since the other planet pinion 9 is in one piece with the said planet pinion 8 and the two pairs of intermeshing pinions 8, 12 and 9, 11 have slightly different speed ratios, the sun pinion 11, which is fast on the shaft 6, will rotate slowly. Thus said shaft 6 will also rotate slowly and the setting is for the speed reduction ratio.

In practice there will, of course, be more than one pair of coaxial planet pinions 8 and 9 in engagement with the common sun pinions 12 and 11. There may, for example, as shown in Figure 1, be two pairs on diametrically opposite sides of the sun pinions, or there could be three spaced at 120 degrees around said sun pinions.

In practice, the pulley 5 is made hollow as shown and the planet pinions 8 and 9 are mounted within it. To render the loose sun pinion 12 capable of being coupled alternatively to the pulley wheel 5 and to a fixed part, said pinion 12 is provided with an axial sleeve-like extension 13 surrounding the shaft 6, which extends to the outside of said pulley wheel 5, and this extension has mounted on it in splined relation, as shown, so as to be axially slidable but not rotatable relative to it, a clutch and brake wheel 14. When said clutch and brake wheel 14 is slid towards said pulley 5 it acts in the nature of a clutch and makes clutching engagement with said pulley and therefore couples the loose sun pinion 12 to said pulley, and when said clutch and brake wheel 14 is slid to the end of its stroke in the other direction, it makes braking engagement with a fixed part 15 and acts as a brake, and thereby couples the loose sun pinion 12 to said fixed part.

Said clutch and brake wheel 14 is biased by means of a spring 16 towards the pulley wheel 5, and thus the direct-drive condition is normally established. The movement of said clutch and brake wheel 14 in opposition to said spring 6 so as to establish the speed-reduction condition, is effected by energising a solenoid 17, the plunger of which is connected to said clutch and brake wheel 14 through the medium of a lever 18 having a bifurcated end 19 straddling a centre boss 20 on said clutch and brake wheel and adapted to bear against the clutch and brake wheel proper so as to form a slip connection in the well known way. Thus, as will be clear from the drawing, when the solenoid 17 is energised, the lever 18 will be rotated counter-clockwise about its axis 21 and the bifurcated end 19 thereof will press the clutch and brake wheel 14 in opposition to the spring 16 away from the pulley 5.

As shown in Figure 2, when the aforesaid gear changing element 7 is moved from its normal to its operative position, a switch element 22 mechanically associated therewith is closed on its contacts 23 just after the commencement of movement of said gear change element and thereby energised the solenoid 17, and when said gear changing element is returned to its normal position said switch element 22 is reopened from its contacts 23 and said solenoid 17 is de-energised. Thus, as before stated, the device normally transmits at its one-to-one speed ratio and is automatically set to its speed reduction ratio while the gears of the machine tool are being actually shifted.

For clutching the clutch wheel 14 to the pulley 5, dog clutch elements 40 are provided, formed as shown respectively on the right hand end of the centre boss 20 of the clutch and brake wheel 14 and on a ring 24 secured to the pulley 5. For clutching said clutching wheel 14 to the fixed part 15 co-engaging coned friction surfaces as illustrated are sufficient. In order to enable the dogs to engage easily and without damage when the clutching wheel 14 (then not rotating) is returned to engagement with the pulley wheel 5 it is desirable that said pulley 5 shall be rotating only slowly, and we achieve this condition by causing the electric motor 1 which constitutes the prime mover to reverse automatically each time the gear changing element 7 is moved from one of its two positions to the other. Thus when the clutch and brake wheel 14 engages the pulley 5 the latter will be slowing down subsequently to the motor connections having been reversed, and the arrangement may be timed so that the dogs engage at a suitably low speed. Incidentally, as will be seen from the drawing, there is a compensating reversal of drive by the transmission device each time it changes from one speed ratio to the other.

Figure 2 illustrates in some detail the way in which the reversal of the motor is effected. In this figure, the references L1, L2 and L3 designate a three-phase supply and the reference 25 designates a main switch for cutting off the whole system from said supply.

When the gear changing element 7 is at the normal position shown the aforesaid contact 22 bridges a pair of contacts 26 and, assuming the main switch 25 to be closed, the winding 27w of an electromagnetic switch 27 will be energised and said switch 27 will close and the motor 1 will be energised through an ordinary reversing switch 28. This is the normal condition and the motor will run in a direction determined by the reversing switch 28 and will drive the machine tool at a speed determined by the setting of the gears.

When now a gear change is to be made, the control element 7 is moved to its operative position and the contact 22 accordingly un-bridges the contacts 26 and bridges the aforesaid contacts 23. The winding 27w is accordingly de-energised, thereby causing the switch 27 to open, and the winding 29w of another electromagnetic switch 29 is energised and said switch 29 closes, and thereby, as will be quite clear from the drawings, the direction of the energisation of the motor 1 is reversed. At the same time, as before described, the solenoid 17 is energised so that the gears are driven at much reduced speed during the gear change, quite irrespective of the slow down of the motor due to the reversal of its connections.

When the gear changing element, having effected the gear change, returns to the normal position, switch 29 will open and switch 27 will close, and the motor 1 will be energised in the original direction. Also solenoid 17 will be de-energised causing the clutch and brake wheel 14 to be directly coupled to the pulley 5 for re-establishing the direct drive from said pulley 5 to the shaft 6. As before described, the arrangement is such that the motor 1 is running at somewhere near zero speed when the dogs of the clutch wheel and of the pulley 5 are engaging.

Dealing now with certain constructional details, the stationary supporting structure is designated throughout Figure 1 by the reference 30. The pulley 5 is formed with a centre boss on each side whereby it bears in ball bearings 31 carried by said supporting structure 30.

The pinion 11 is also formed with a boss, as shown, which bears within the boss of the pulley 5 on the right hand side and said pinion is keyed to the shaft 6 by means of a key 32. The extension 13 of the pinion 12 bears within the boss of the pulley 5 on the left hand side and the said extension is internally lined with a bearing bush 33 which surrounds the shaft 6.

The spring 16 is in compression between the end of the boss 20 of the clutch and brake wheel 14 and a collar 34 which is loose on the shaft 6 and is supported against axial movement by means of an end thrust ball bearing 35 carried by a fixed bearing bush 36 in which the shaft 6 bears.

It will be seen that when the direct drive condition obtains, with the pulley 5 and shaft 6 together with all their associated parts rotating as one unit, the bearings for said unit will be constituted by the two ball races 31 and the bearing bush 36. The spring 16 and collar 34 will also rotate and the ball race 35 will, therefore, be in operation.

When the slow transmission condition obtains, with the pulley 5 rotating relatively quickly, and the pinion 11 and shaft 6 rotating relatively slowly and the pinion 12 and extension 13 together with the bush 33 being stationary, it will be seen that, in addition to the bearings afforded by the bearings 31 and 36, bearing surfaces will be provided between the boss on the pinion 11 and the right hand boss of the pulley 5, and also between the extension 13 and the left hand boss of the pulley 5 and between the bush 33 and the shaft 6. At this time, the spring 16 and collar 34 will be stationary and the ball race 35 will, therefore, not be operative.

It may be found preferable to provide dog elements for engaging clutch and brake wheel to the fixed part. In such cases the dogs will preferably engage an intermediate part which is permanently frictionally coupled to the fixed part. Thus, when the dogs first engage, the intermediate part is capable of a slipping movement against friction, and the shock caused by bringing the clutch wheel to rest is minimised.

It is to be understood that the invention is not limited to use with gears which have pre-selecting means as above described, but the transmission device can also be used in connection with gears which are changed in the usual way, as for example by means of two or more levers. In this case there would be a manually operated master switch controlling the solenoid. Said master switch would have a "normal running" or open position, at which the solenoid is de-energised and the transmission device is in the direct-drive state, and a "speed change" or closed position, at which the solenoid is energised and the transmission device is in the speed-reduction state. When the operator is about to change gear he would simply move the master switch to the "speed change" position and would return it to the normal running position when the gear change is effected.

It may be found possible, perhaps by resorting to a friction clutch in place of the dog clutch, to obviate the necessity of reversing the motor in the manner above described, each time the transmission device is actuated from one of its two states to the other.

I claim:

1. In a change speed transmission, the combination including, a prime mover, a driven device, a change speed gearing, and a transmission mechanism, said prime mover being adapted to drive said driven device through said transmission mechanism and said change speed gearing in that order, said transmission mechanism comprising driving and driven elements rotatable about a common axis, a pair of coaxial planet pinions having different diameters and constrained to rotate as one piece, said pinions being rotatably mounted on said driving element with their axis parallel to and at a given radius from the axis of said elements, a sun pinion fast on said driven element and in mesh with one of said planet pinion, a sun pinion rotatable about the axis of said elements and in mesh with the other planet pinion, and means whereby said last named sun pinion is adapted alternatively to be coupled either fast to one of said elements whereby the transmission ratio from said driving to said driven element is unity or fast to a fixed part whereby the transmission ratio from said driving to said driven element is greatly reduced, a member movable to effect any of a plurality of gear changes of said change speed gearing and means whereby in response to the movement of said member to effect any of such changes, said last named sun pinion is uncoupled from said one of said elements and is coupled fast to said fixed part.

2. In a change speed transmission, the combination including, a prime mover, a driven device, a change speed gearing, and a transmission mechanism, said prime mover being adapted to drive said driven device through said transmission mechanism and said change speed gearing in that order, said transmission mechanism comprising driving and driven elements rotatable about a common axis, a pair of coaxial planet pinions having different diameters and constrained to rotate as one piece, said pinions being rotatably mounted on said driving element with their axis parallel to, and at a given radius from, the axis of said elements, a sun pinion fast on said driven element and in mesh with one of said planet pinions, a sun pinion rotatable about the axis of said elements and in mesh with the other planet pinion, and means whereby said last named sun pinion is adapted alternatively to be coupled either fast to one of said elements whereby the transmission ratio from said driving to said driven element is unity or fast to a fixed part whereby the transmission ratio from said driving to said driven element is greatly reduced, means to preselect a given gear change of said change speed gearing, a member movable from a first position to a second position to effect the preselected gear change and returnable to said first position when said gear change is effected, means whereby in response to the movement of said member from said first position towards said second position, said last-named sun pinion is uncoupled from said one of said elements and is coupled fast to said fixed part, and means whereby, in response to the return movement of said member from said second position to said first position, said last-named sun member is uncoupled from said fixed part and is coupled fast to said one of said elements.

3. In a change speed transmission, the combination including, an electric motor, a driven device, a change speed gearing, and a transmission mechanism, said electric motor being adapted to drive said driven device through said transmission mechanism and said change speed gearing in that order, said transmission mechanism comprising driving and driven elements rotatable about a common axis, a pair of coaxial planet pinions having different diameters and constrained to rotate as one piece, said pinions being rotatably mounted on said driving element with their axis parallel to and at a given radius from the axis of said elements, a sun pinion fast on said driven element and in mesh with one of said planet pinions, a sun pinion rotatable about the axis of said elements and in mesh with the other planet pinion, and means whereby said last-named sun pinion is adapted alternatively to be coupled either fast to one of said elements whereby the transmission ratio from said driving to said driven element is unity or fast to a fixed part whereby the transmission ratio from said driving to said driven element is greatly reduced, a member movable to effect a gear change of said change speed gearing, means whereby in response to the movement of said member to effect such change said last named sun pinion is uncoupled from said one of said elements and is coupled fast to said fixed part, and means whereby, in response to the movement of said member to effect such gear change, the circuit connections to said electric motor are reversed said means including an electric circuit connected to said motor and including pairs of spaced contact members and two electro-magnetic switches and a motor reversing switch, whereby when a certain pair of said contact members are connected in the motor circuit by the movable gear change member the reversing switch is operated to reverse the motor.

4. In a change speed transmission, the combination including, an electric motor, a driven device, a change speed gearing, and a transmission mechanism, said electric motor being adapted to drive said driven device through said transmission mechanism and said change speed gearing in that order, said transmission mechanism comprising driving and driven elements rotatable about a common axis, a pair of coaxial planet pinions having different diameters and constrained to rotate as one piece, said pinions being rotatably mounted on said driving element with their axis parallel to and at a given radius from the axis of said elements, a sun pinion fast on said driven element and in mesh with one of said planet pinions, a sun pinion rotatable about the axis of said elements and in mesh with the other planet pinion, and means whereby said last named sun pinion is adapted alternatively to be coupled either fast to one of said elements whereby the transmission ratio from said driving to said driven element is unity or fast to a fixed part whereby the transmission ratio from said driving to said driven element is greatly reduced, means to preselect a given gear change of said change speed gearing, a member movable from a first position to a second position to effect the preselected gear change and returnable to said first position when said gear change is effected, means whereby in response to the movement of said member from said first position towards said second position, said last-named sun pinion is uncoupled from said one of said elements and is coupled fast to said fixed part, an electrical circuit connected to said motor and including pairs of spaced contact members and a reversing switch and one pair of circuit connections to said electric motor and reversing switch are energized to reverse the motor and means whereby, in response to the return movement of said member from said second position to said first position, said last-named sun member is uncoupled from said fixed part and is coupled fast to said one of said elements and the other pair of circuit connections to said electric motor are restored to drive the electric motor in the opposite direction.

JAMES SELBY.

REFERENCES CITED

The following references are of record in the file of this patent:

UNITED STATES PATENTS

| Number | Name | Date |
| --- | --- | --- |
| 1,367,264 | Johanson | Feb. 1, 1921 |
| 2,066,873 | Barnes | Jan. 5, 1937 |
| 2,102,227 | Sinclair | Dec. 14, 1937 |
| 2,177,951 | Simpson | Oct. 31, 1939 |
| 2,180,202 | Hallden | Nov. 14, 1939 |
| 2,203,743 | Parsons | June 11, 1940 |
| 2,348,424 | Shorter | May 9, 1944 |
| 2,413,763 | Heyer | Jan. 7, 1947 |